US012202577B2

(12) United States Patent
Mayer et al.

(10) Patent No.: US 12,202,577 B2
(45) Date of Patent: Jan. 21, 2025

(54) CABLE MANAGEMENT SYSTEMS FOR CONNECTING POWER AND COMMUNICATION CABLES FROM FLOATING SOLAR ARRAYS TO ONSHORE EQUIPMENT

(71) Applicant: NORIA ENERGY, Sausalito, CA (US)

(72) Inventors: Alex Mayer, Mill Valley, CA (US); Jason King, San Francisco, CA (US); James Raiford, San Francisco, CA (US); Ralf Schulze, San Francisco, CA (US); Becca Suchower, Sausalito, CA (US)

(73) Assignee: NORIA ENERGY, Sausalito, CA (US)

( * ) Notice: Subject to any disclaimer, the term of this patent is extended or adjusted under 35 U.S.C. 154(b) by 0 days.

(21) Appl. No.: 18/612,354

(22) Filed: Mar. 21, 2024

(65) Prior Publication Data

US 2024/0332855 A1 Oct. 3, 2024

Related U.S. Application Data

(60) Provisional application No. 63/454,787, filed on Mar. 27, 2023.

(51) Int. Cl.

| | |
|---|---|
| ***B63B 21/50*** | (2006.01) |
| ***B63B 21/20*** | (2006.01) |
| ***B63B 35/00*** | (2020.01) |
| *B63B 35/44* | (2006.01) |
| *H01R 13/52* | (2006.01) |

(52) U.S. Cl.
CPC .............. *B63B 21/50* (2013.01); *B63B 21/20* (2013.01); *B63B 35/00* (2013.01); *B63B 2035/4453* (2013.01); *H01R 13/5205* (2013.01)

(58) Field of Classification Search
CPC . B63B 35/00; B63B 2035/4453; B63B 21/20; B63B 21/50
See application file for complete search history.

(56) References Cited

FOREIGN PATENT DOCUMENTS

| | | | | | |
|---|---|---|---|---|---|
| AU | 2009101216 | A4 | * | 1/2010 | |
| CN | 111164008 | A | * | 5/2020 | ............. B63B 35/00 |
| KR | 20110053171 | A | * | 5/2011 | |
| KR | 20110053210 | A | * | 5/2011 | |
| KR | 20110053211 | A | * | 5/2011 | |
| KR | 101682856 | B1 | * | 12/2016 | |
| KR | 101813053 | B1 | * | 12/2017 | |
| KR | 20190015075 | A | * | 2/2019 | |
| KR | 20200037526 | A | * | 4/2020 | |
| WO | WO-2014003340 | A1 | * | 1/2014 | |

* cited by examiner

*Primary Examiner* — Frederick L Lagman
(74) *Attorney, Agent, or Firm* — David R. Heckadon; Gordon Rees Scully Mansukhani LLP

(57) ABSTRACT

A cable management system for one or more floating solar PV arrays including a cable tensioning system that adjusts the length of, or maintains the tension in, a power or communication cable that runs from shore to the floating solar array, or between floating solar arrays while permitting the floating solar array(s) to move on the water. The cable tensioning system optionally includes a winch, a counter-weight, an elastic member and/or one or more floating towers.

18 Claims, 15 Drawing Sheets

Fig. 3A (top) and Fig. 3B (bottom)

Fig. 4A (top) and Fig. 4B (bottom)

Fig. 5A (top) and Fig. 5B (bottom)

Fig. 7A (top) and Fig. 7B (bottom)
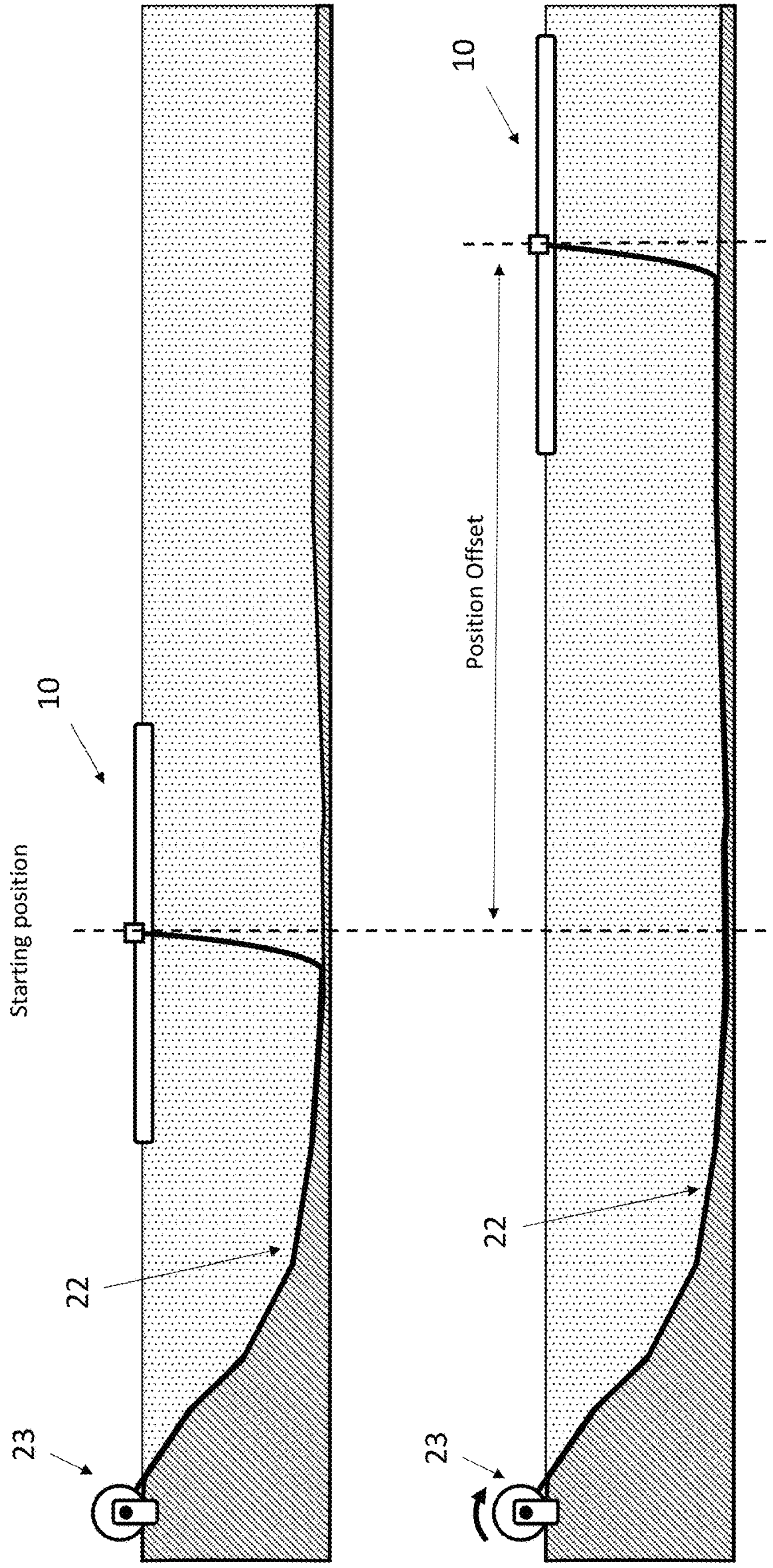

Fig. 8A (top) and Fig. 8B (bottom)
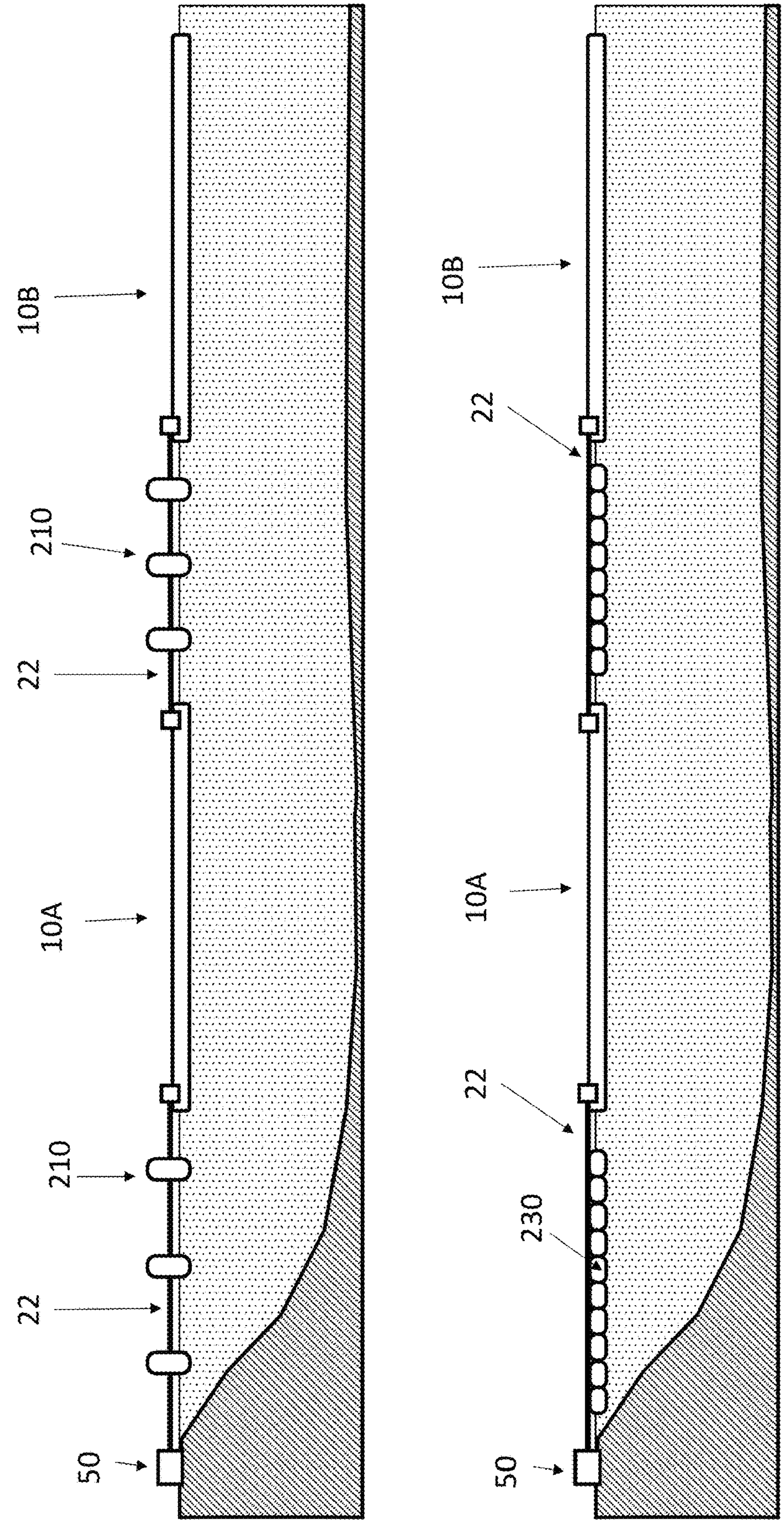

Fig. 8C (top) and Fig. 8D (bottom)
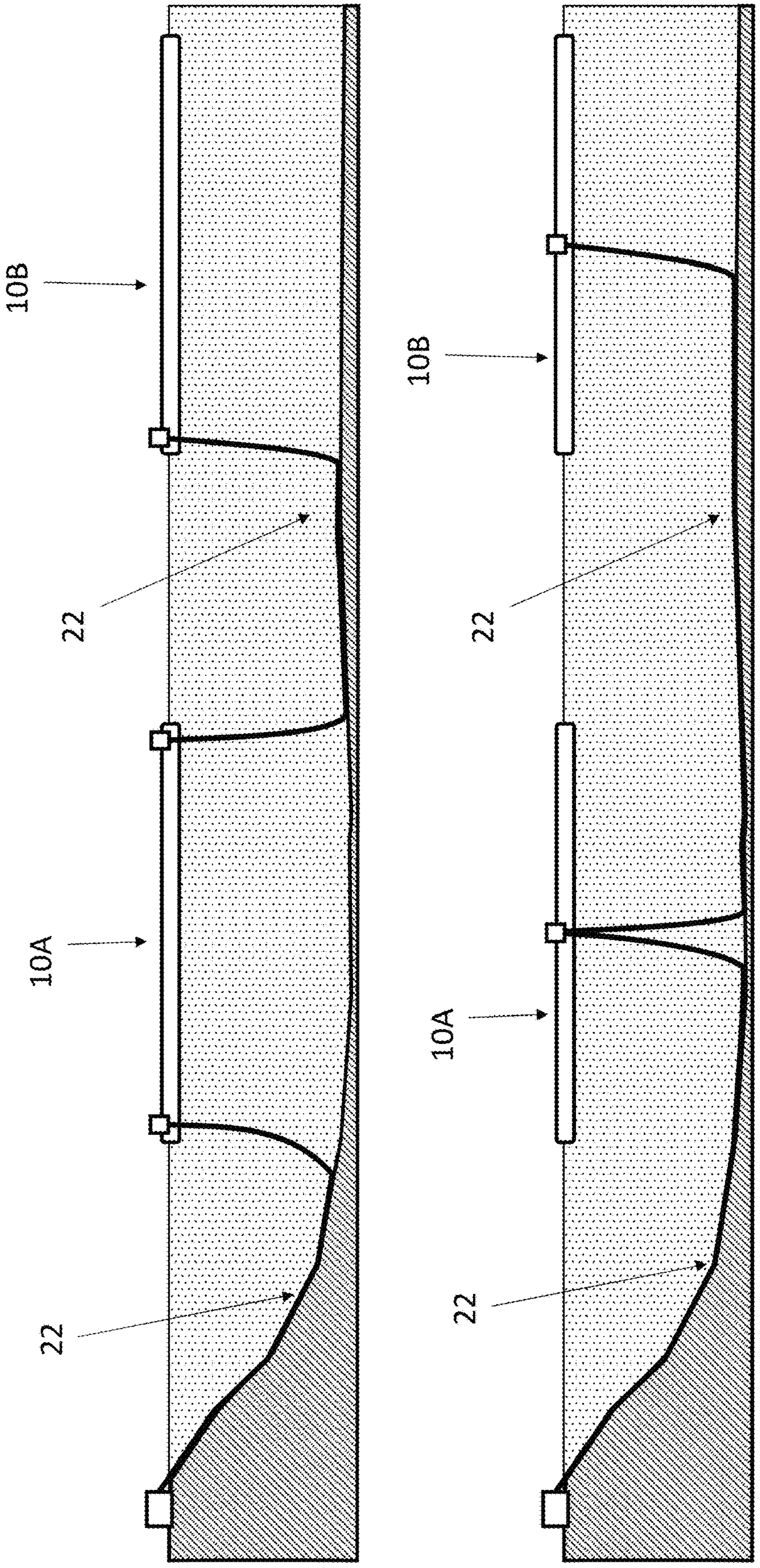

CABLE MANAGEMENT SYSTEMS FOR CONNECTING POWER AND COMMUNICATION CABLES FROM FLOATING SOLAR ARRAYS TO ONSHORE EQUIPMENT

RELATED APPLICATION

The present application claims priority to U.S. Provisional Patent Application Ser. No. 63/454,787, entitled Elevated Cable Systems for Connecting a Power Cable from a Floating Solar Array to an Onshore Grid, filed Mar. 27, 2023, the entire disclosure of which is incorporated herein by reference in its entirety for all purposes.

GOVERNMENT LICENSE RIGHTS STATEMENT

This invention was made with government support under DE-SC0021714 awarded by the U.S. Department of Energy. The government has certain rights in the invention.

TECHNICAL FIELD

The present invention relates to floating solar photovoltaic (PV) arrays.

BACKGROUND OF THE INVENTION

Floating solar PV arrays use a power cable system to transport the power they generate to an onshore electrical grid. In the past, three different power cable approaches have been attempted. They all have their advantages and disadvantages, as follows. First, for systems that are moored close to shore, floating pathways have been used for the cables. Simply put, a floating pathway from the shore to the floating solar array is constructed and the power cable is placed on top of the floating pathway. This is the cheapest approach but does not work well in rough waters or when the FPV system is far from shore. In addition, this approach limits boat access around the array as it essentially becomes a barrier sitting on top of the water. In a second approach, the power cable(s) can be strung through a series of floating buoys. This approach provides better protection for the power cables (which must now be rated to pass safely on or just under the surface of the water), but is typically more expensive than the floating pathway. This second approach still unfortunately limits boat traffic around the array. A third approach is to use underwater cabling. Simply put, the third approach has the power cables running underwater down from the floating array and across the bottom of the water body, and then emerge on shore. This approach solves the boat obstruction problem, but unfortunately, it is the most expensive. This is because the power cables must now be rated for underwater/submarine use. These types of underwater cables have sturdy protective outer jackets, and must withstand both high pressures and corrosion underwater, making them expensive.

What is instead needed is a system for transmitting the power generated by a floating solar array to the shore or between multiple arrays without providing obstructions for boats or requiring expensive underwater/submarine rated cables. It is also desirable that this new system does not disturb the body of water and harm its animal or plant life. As will be shown, the present system addresses these concerns.

A second common problem with the cables running from shore to a floating solar PV array or between multiple arrays is that they do not adequately compensate for movement of the floating solar PV array(s) on the water. Due to wind and water currents, the floating solar PV array is sometimes farther from shore and it is sometimes closer to shore. This problem has required the installation of longer lengths of cable than would otherwise be desired. In addition to increasing system costs, such long cables have the potential to become entangled, pinched, or move about on the floating solar PV array, or on the floats supporting the cables, or on the bottom of the body of water. Conversely, if the cables installed are too short, they will simply not reach far enough to be able compensate for the typical movement of the floating solar PV array(s). This problem can lead to the connectors on either end of the cable being pulled and result in broken connectors. In addition, some movement of the floating solar PV array may specifically be desired, for example, rotating the array to track the path of the sun over the course of the day. As a result, system designers have been forced to use long lengths of slack cable which is often difficult to manage. As will be shown, the present invention addresses these concerns such that the length of cable between arrays or from an array to shore is managed to accurately correspond to the position of the arrays.

SUMMARY OF THE INVENTION

The present invention provides a cable management system for one or more floating solar PV arrays. The present system includes a cable tensioning system that adjusts the effective length or maintains tension in a power or communication cable running from shore to a floating solar array, from one floating solar PV array to another, or from a floating solar PV array to a floating central cable hub. An important advantage of the present cable tensioning system is that it permits the floating solar array(s) to move on the water without requiring excessively long lengths of cable to accomplish this.

In preferred aspects, the present cable tensioning system may include a winch, a counterweight, an elastic member and/or one or more floating towers. In one preferred aspect, the present cable management system for a floating solar PV array comprises: (a) a floating solar PV array; (b) a cable system connecting the floating solar PV array to an onshore point; and (c) a cable tensioning system, wherein the cable tensioning system either adjusts the effective length of the cable or maintains tension in a cable while permitting the floating solar array to move about on the water.

The present cable tensioning system may optionally include a winch for retracting the cable as the floating solar array moves closer to shore and for extending the cable as the floating solar array moves farther away from shore. The present cable tensioning system may also include a counterweight and pulley system for retracting the cable as the floating solar array moves closer to shore and for extending the cable as the floating solar array moves farther away from shore.

In one preferred aspect, the cable tensioning system comprises one or more floating towers that support the cable in an elevated position above the water level. The advantage of this approach is that it permits boat access to the array from all sides when needed for maintenance or repair. In these preferred aspects, the cable may pass from the onshore point to the floating tower, and then from the floating tower to the floating solar PV array. A number of towers may be used to span the distance between the shore and the floating solar PV array. The present floating tower structure can also be used for cable management among various floating solar PV arrays sitting on the water. In other preferred aspects, one or more floating towers can be used to suspend cables that run from shore to a floating central cable hub (to which various floating solar PV arrays are then connected).

In further optional aspects, the cable is connected to the floating tower(s) at a vertically movable location on the floating tower(s). In this aspect of the invention, the effective length or tension in the cable is controlled by adjusting the height at which each tower(s) supports the cable. Specifically, as the floating solar PV array moves farther from shore, the height of the point(s) where the cable(s) are attached to the tower(s) can be lowered relative to the water surface. Conversely, as the floating solar PV array moves closer to shore, the height of the point(s) at which each tower(s) supports the cable(s) can be raised relative to the water surface to take up slack in the cable and keep the cable out of the water.

In further optional aspects, the cable tensioning system comprises an elastic member that contracts as the floating solar PV array moves closer to shore (or as two floating solar PV arrays move together) and stretches as the floating solar PV array moves farther away from shore (or as two floating solar PV arrays move farther apart). This elastic member supports the cable. The cable may optionally be wrapped around the elastic member, or simply hung from the elastic member. The cable is longer than the maximum extension of the elastic member.

In all aspects of the invention discussed herein, the cable may be a power transmission cable or a communication cable. It may also be some other form of cable, all kept within the scope of the present system. In various aspects, the power cable may be a DC cable (for example, when the system inverter is onshore), or an AC power cable (for example, if the system inverter is on the floating solar PV array or on the floating central cable hub).

In various aspects of the present system, one end of the cable may be attached to any one of an onshore point (such as the electrical box for an onshore power grid), a first or second floating solar PV array, a floating tower or a floating central cable hub. The other end of the cable may be attached at any one of a floating solar PV array, a second floating solar PV array, a floating tower, or a floating central cable hub. It is therefore to be understood that the present cable tensioning system may be installed at multiple locations in system designs having a plurality of different floating solar PV arrays connected in different patterns and connected to shore.

It is also to be understood that the present cable tensioning system as described herein may be used to adjust the effective length or manage tension in cables that are suspended above water level by floating towers, are supported at water level by floats, rafts and buoys, or are running underwater along the bottom of the lake, river or ocean.

In other aspects, the present system provides a cable management system for a plurality of floating solar PV arrays, comprising: a plurality of floating solar PV arrays; a cable management system routing cables from either a first floating solar PV array or a floating central cable hub to an onshore point; and a cable tensioning system, wherein the cable tensioning system adjusts the effective length or maintains tension in one or more of the cables in the cable system between the arrays and shore while permitting each of the plurality of floating solar arrays to move on the water. This cable system may route all PV array's cables from the first floating solar PV array to the onshore point with the other floating solar PV arrays being routed in series to the first floating solar PV array. Alternatively, the other floating solar PV arrays may be routed in parallel to the first floating solar PV array. In another preferred aspect, the plurality of floating solar PV arrays may each have cables that are separately routed to a floating central cable hub, and the cables from all arrays may in turn be routed from the central cable hub to an onshore location such as an onshore grid. It is to be understood that separate power or communication cables may be running between the various components of the overall system (i.e.: the various floating solar PV arrays, the various floating towers, a central cable hub, etc.). In such arrangements, a plurality of separate cable tensioning systems may be distributed among the plurality of solar PV arrays, with one cable tensioning system being used for each cable or single bundle of cables. In one optional embodiment, a cable may connect a floating water treatment machine (such as a floating aerator) to one of the plurality of floating solar PV arrays. In this embodiment, the cable tensioning system adjusts the effective length and/or manages the slack or tension in the cable to the water treatment machine.

The present invention increases the reliability of the grid connection and decreases the cost of grid connection. It also enables the length of the grid connection cable to be dynamically adjusted, allowing for flexible floating solar PV array positioning. An additional advantage of the present system is that (when using floating towers) it optionally suspends the power cables above the water body, thereby reducing the footprint of the array's installation on the water surface. Another advantage of the present floating tower system is that less expensive cabling can be used (as compared to expensive heavy-duty underwater/submarine rates cables). Yet another advantage of the floating tower design is that it permits boat movement around the full perimeter of the solar PV array (which can be important when accessing the array for maintenance or repair).

BRIEF DESCRIPTION OF THE DRAWINGS

FIG. 7A is a schematic illustration of a floating solar PV array connected to shore with a submerged cable, showing a winch system for adjusting the effective length of the cable or maintaining tension in the cable.

FIG. 7B corresponds to FIG. 7A, but shows additional cable dispensed from the winch when the floating solar PV array moves farther from shore.

FIG. 8A is a schematic illustration of various cables passing from shore to a first floating solar PV array and from the first floating solar PV array to a second floating solar PV array using cable buoys.

FIG. 8B is similar to FIG. 8A, but uses a series of floats on which the cables are placed.

FIG. 8C is similar to FIGS. 8A and 8B, but uses submerged cables connected to the edges of the floating solar PV arrays.

FIG. 8D is similar to FIG. 8C, but the submerged cables are connected to the centers of the floating solar PV arrays.

DETAILED DESCRIPTION OF THE DRAWINGS

Figure 1:
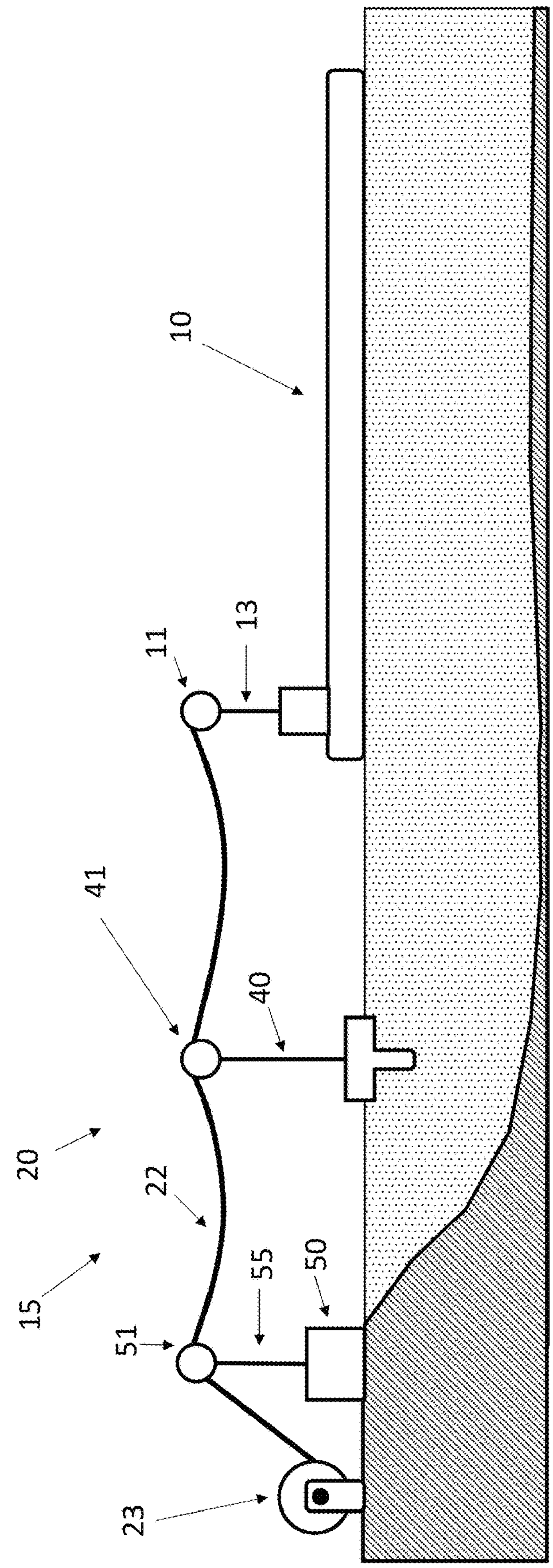
FIG. 1 is a schematic illustration of a power or communication cable running from shore to a floating solar PV array, showing a winch system for adjusting an effective length of the cable or maintaining tension in the cable.

Referring first to FIG. 1, the present invention provides a cable management system for a floating solar PV array, comprising: a floating solar PV array 10; a cable system 15 connecting floating solar PV array 10 to an onshore point 50; and a cable tensioning system 20, wherein cable tensioning system 20 adjusts the effective length or maintains tension in cable 22 while permitting floating solar array 10 to move about on the water (for example, as a result of wind, water currents, or planned movement, for example, to track the movement of the sun over the course of the day).

Cable 22 may be a power transmission cable, a communication cable or some other form of cable. In optional embodiments, cable 22 may be aluminum or copper, having a conductor sized from 10 AWG to 1100 kcmil. The cable jacket may be made of various materials, including but not limited to polyethylene, polyamide, polyvinyl chloride, polyurethane, neoprene, and Ethylene-Propylene-Diene-Monomer (EPDM). Cable 22 may optionally support DC voltages between 100V and 1500V, or AC voltages between 110V and 34,500V. It is to be understood, however, that cable 22 is not limited to these particular materials and voltages.

It is to be understood that the present references to "cable tensioning" herein include both or either of adjusting or maintaining the physical force of tension in the cable or adjusting the effective length of cable spanning between two points (such as an onshore point and the floating solar array 10). As seen in FIG. 1, the cable tensioning system 20 comprises a winch 23. Winch 23 retracts the cable as floating solar array 10 moves closer to shore and extends the cable as floating solar array 10 moves farther away from shore. As such, winch 23 exerts tension on cable 22 to wind up the cable, thereby resulting in a shorter "effective length" of cable spanning between the onshore point 50 and the floating solar PV array 10 when array 10 moves closer to shore. As understood herein, the "effective length" of cable is the length of cable between two points. Preferably, winch 23 comprises a rotating spool or a retractable reel around which cable 22 is wound.

As can also be seen in FIG. 1, a floating tower 40 is also provided. At the top of tower 40 is a pulley 41. A second pulley 51 is provided on top of an onshore tower 55, and a third pulley 11 may be located on a tower 13 on array 10. Cable 22 is free to travel over pulleys 51, 41 and 11. Alternatively, cable 22 may pass through an aperture near the top of tower 40. Other systems that allow cable movement at the tower(s) are also contemplated, all keeping within the scope of the present invention. When array 10 moves closer to shore, cable 22 will start to droop or slack, coming closer to the water level. When this occurs, winch 23 will begin to wind up the end of cable 22, thereby pulling the cable 22 taught, keeping it above the water level. Conversely, as array 10 moves farther from shore, winch 23 will unroll more cable 22 such that the cable 22 is able to reach to the new (more distant) position of array 10. Preferably, the present cable tensioning system matches the gravitational forces on cable 22 and the buoyancy and mooring forces on the floating tower(s). In addition, the present cable management system is configured such that no cable tension is exerted on the connection point to the system inverter. Tower 13 is preferably located at or near a disconnect or junction box on array 10.

The advantage of cable tensioning system 20 using this approach is that cable 22 can be kept at a similar height above the water level regardless of the position of array 10. By keeping cable 22 high above the water, boats can thereby access array 10 from all sides. This is very advantageous for repair and maintenance of the array. Another advantage of the present system of keeping cable 22 above the water level is that less expensive cables can be used. (In contrast, underwater cabling requires expensive cables rated for use at high pressures and are resistant to underwater environments such as seawater).

It is to be understood that the present system may only use one floating tower 40 (as seen in FIG. 1), or it may use a plurality of floating towers 40, with cable 22 spanning from shore across all the plurality of towers to eventually reach array 10. The closer array 10 is to shore, the fewer floating towers 40 may be required. The farther array 10 is from shore, the greater the number of floating towers 40 that may be required. It is to be understood that the present invention is not limited to any specific number of floating towers. Zero, one or more than one tower may be used. In addition, some or all of these towers may instead be mounted to the bottom of the body of water, and therefore need not be "floating". As such, any reference herein to a "floating tower" is understood to include a tower attached, affixed or moored to the bottom of the body of water as well.

In various preferred aspects, tower 40 may hold cable 22 between 0.5 and 5 meters above the water. Tower 40 may preferably support 600 kg loads each (and an overall system load of up to 30,000 kg), and the power cables 22 may have diameters from 5 to 50 mm and cable lengths from 1-100 meters (or more). It is to be understood, however, that these dimensions and strengths are exemplary and that the present invention is not limited to any particular dimensions or strengths.

Figure 2:
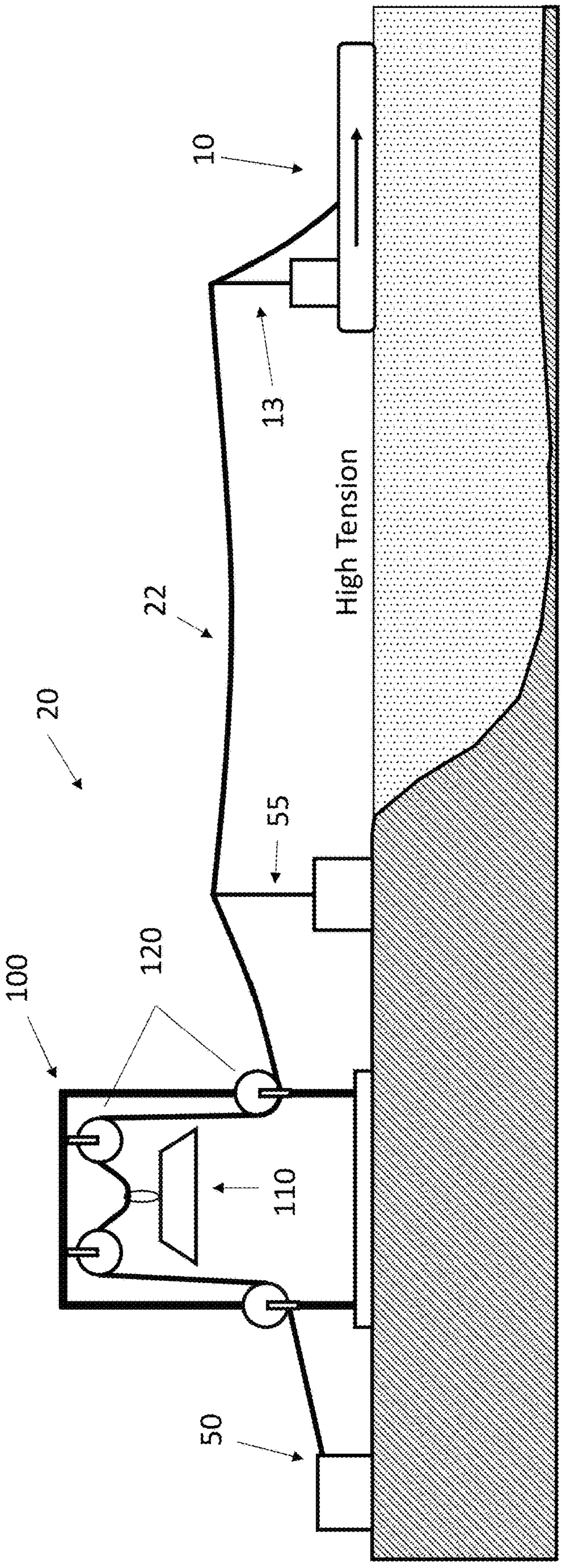
FIG. 2 is a schematic illustration of a power or communication cable running from shore to a floating solar PV array, showing a counterweight and pulley system for adjusting an effective length of the cable or maintaining tension in the cable.

FIG. 2 illustrates a cable tensioning system 20 that comprises a counterweight and pulley system 100 for retracting cable 22 as floating solar array 10 moves closer to shore and for extending cable 22 as floating solar array 10 moves farther away from shore. Specifically, system 100 includes a counterweight 110 and a series of pulleys 120. Counterweight 110 ensures tension in cable 22. As array 10 moves farther from shore, counterweight 110 will be lifted. Conversely, as array 10 moves closer to shore, counterweight 110 will be lowered. By using pulleys 120 or optional additional pulleys, a small vertical movement of counterweight 110 will translate into a much larger movement of cable 22. One advantage of the system of FIG. 2 is that (in contrast to the system of FIG. 1), no power is required to retract or extend the effective length of cable 22 between onshore point 50 and array 10.

Figure 3:
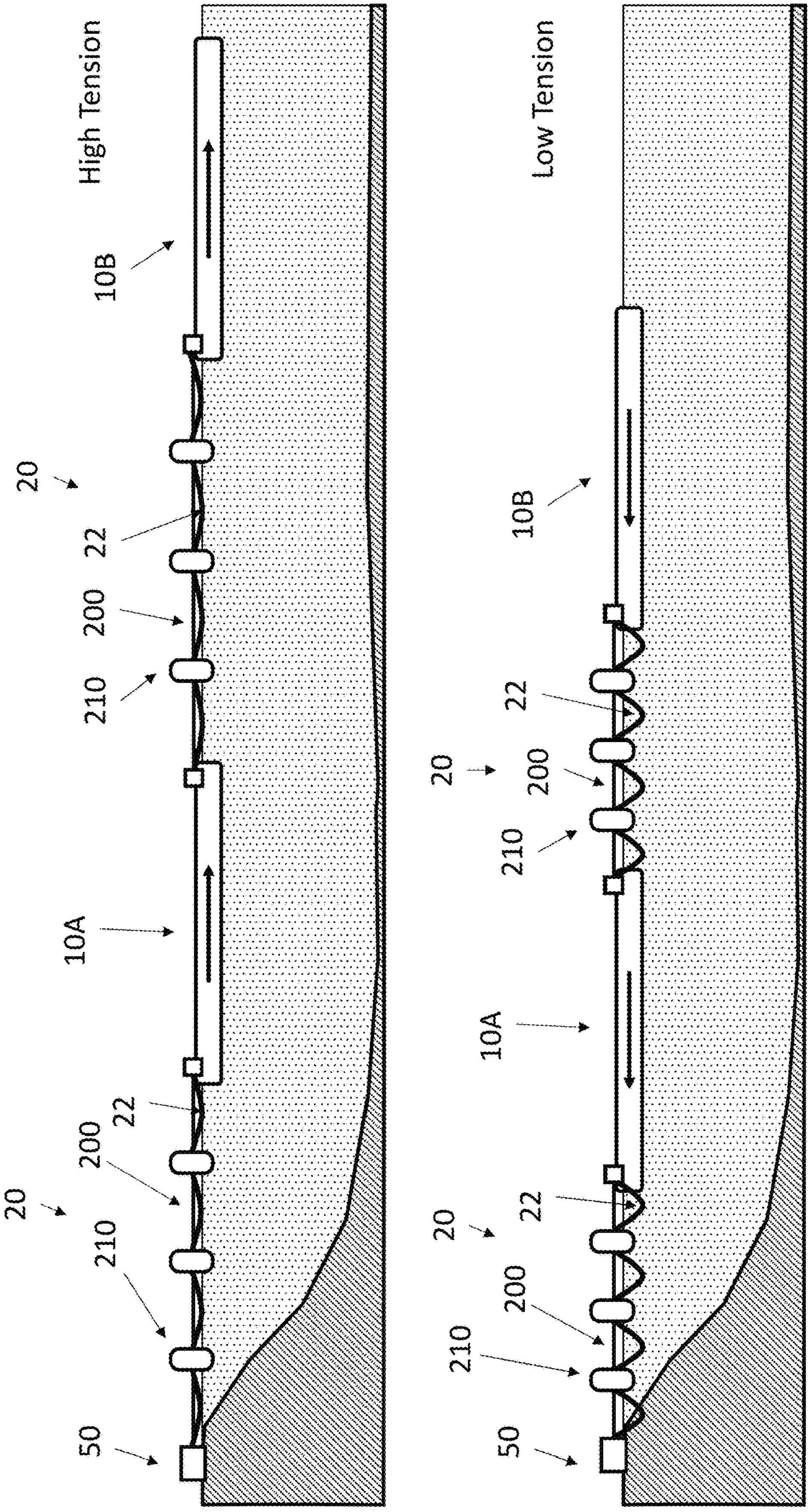
FIG. 3A is a schematic illustration of a power or communication cables running from shore to a first floating solar PV array and from the first floating solar PV array to a second floating solar PV array, showing elastic members for adjusting the effective lengths of the cable, with the elastic members being stretched into their extended position. The cables are suspended from buoys.
FIG. 3B is an illustration similar to FIG. 3A, but with the elastic members in their contracted position.

Next, FIGS. 3A and 3B show an alternate cable tensioning system 20. Specifically, a first cable tensioning system 20 is provided between onshore point 50 and a first solar PV array 10A, and a second cable tensioning system 20 is provided between the first solar PV array 10A and a second solar PV array 10B. In this preferred embodiment, cable tensioning system 20 comprises an elastic member 200. Elastic member 200 may be made of a rubber material, a bungee cord material or a spring assembly. In operation, elastic member 200 is at one (shorter) position when under low tension and stretches to a (longer) position when pulled. Cable 22 is slightly longer than the maximum extended length of elastic member 200. When array 10A moves farther from shore and array 10B moves farther from array 10A, elastic members 200 will be pulled to stretch or expand or lengthen. Conversely, as seen in FIG. 3B, when array 10A moves closer to shore and array 10B moves closer to array 10A, elastic member 200 will not be pulled and will shorten. As seen in FIGS. 3A and 3B, cable 22 may be supported by elastic member 200. For example, floats/buoys 210 may be used to support both elastic members 200 (which may simply pass through holes in floats/buoys 210) with cable 22 also passing through these same holes in floats/buoys 210 (or be otherwise connected or attached to floats/buoys 210). As seen in FIG. 3A when the system is under higher tension, floats/buoys 210 may move farther apart from one another, yet some slack still exists in cable 22 as shown. This is because the length of cable 22 at these locations is somewhat longer than the maximum extension length of elastic member 200. As seen in FIG. 3B when the system is under low (or negligible) tension, floats/buoys 210 will move closer together as elastic members 200 contract. As can be seen, cable 22 (which is basically hung from floats/buoys 210) will tend to droop more (as compared to FIG. 3A), yet the elastic member still guides the position of cable 22, as shown.

Figure 4:
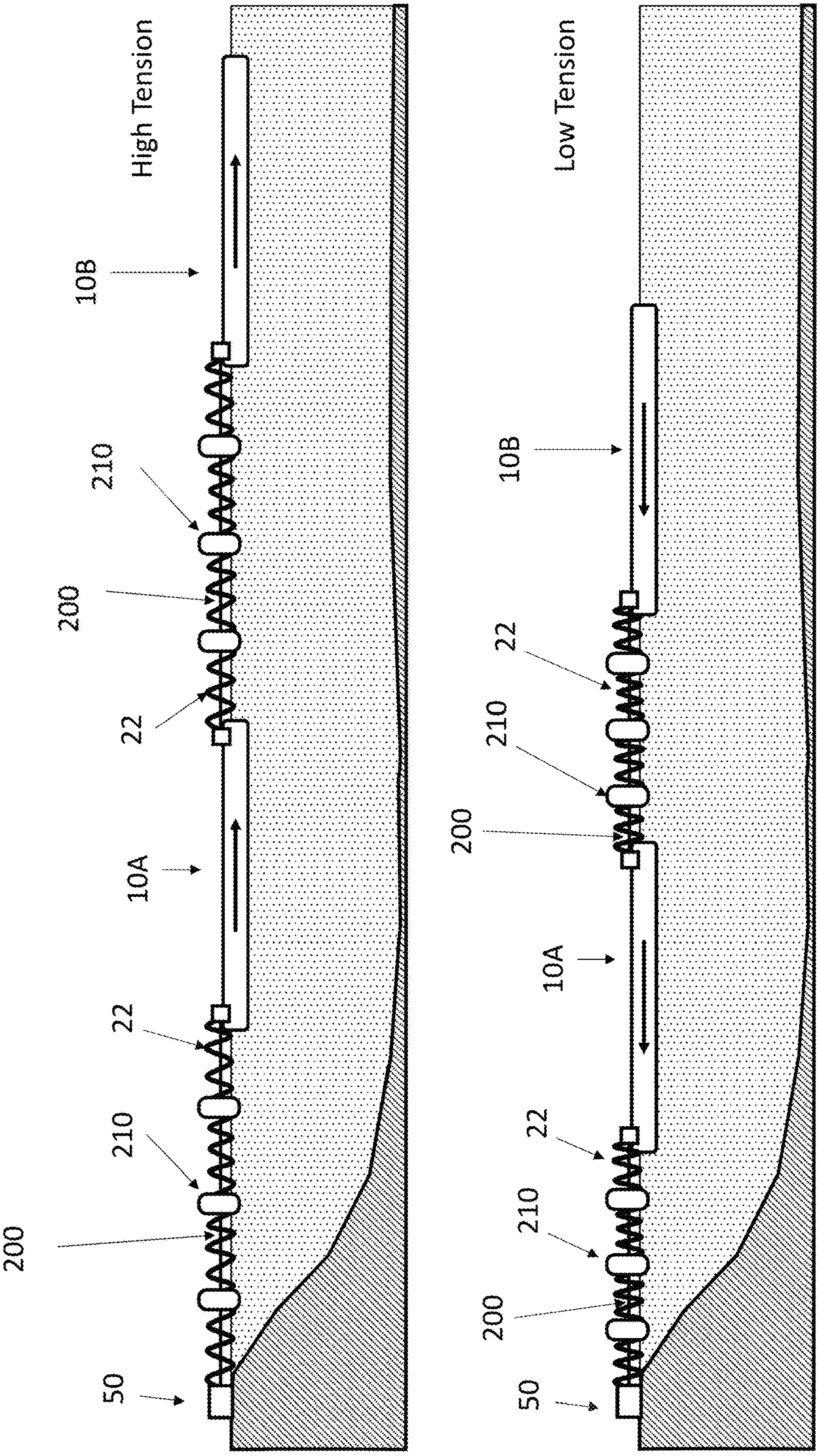
FIG. 4A is an illustration similar to FIG. 3A, but with the cables also being wrapped around the elastic members.
FIG. 4B is an illustration similar to FIG. 3B, but with the cables also being wrapped around the elastic members.

FIGS. 4A and 4B are similar to FIGS. 3A and 3B, but in this instance, cable 22 has instead been wrapped around elastic member 200. The advantage of this approach is that cable 22 tends not to droop down into the water as far as was seen in FIG. 3B.

Figure 5:
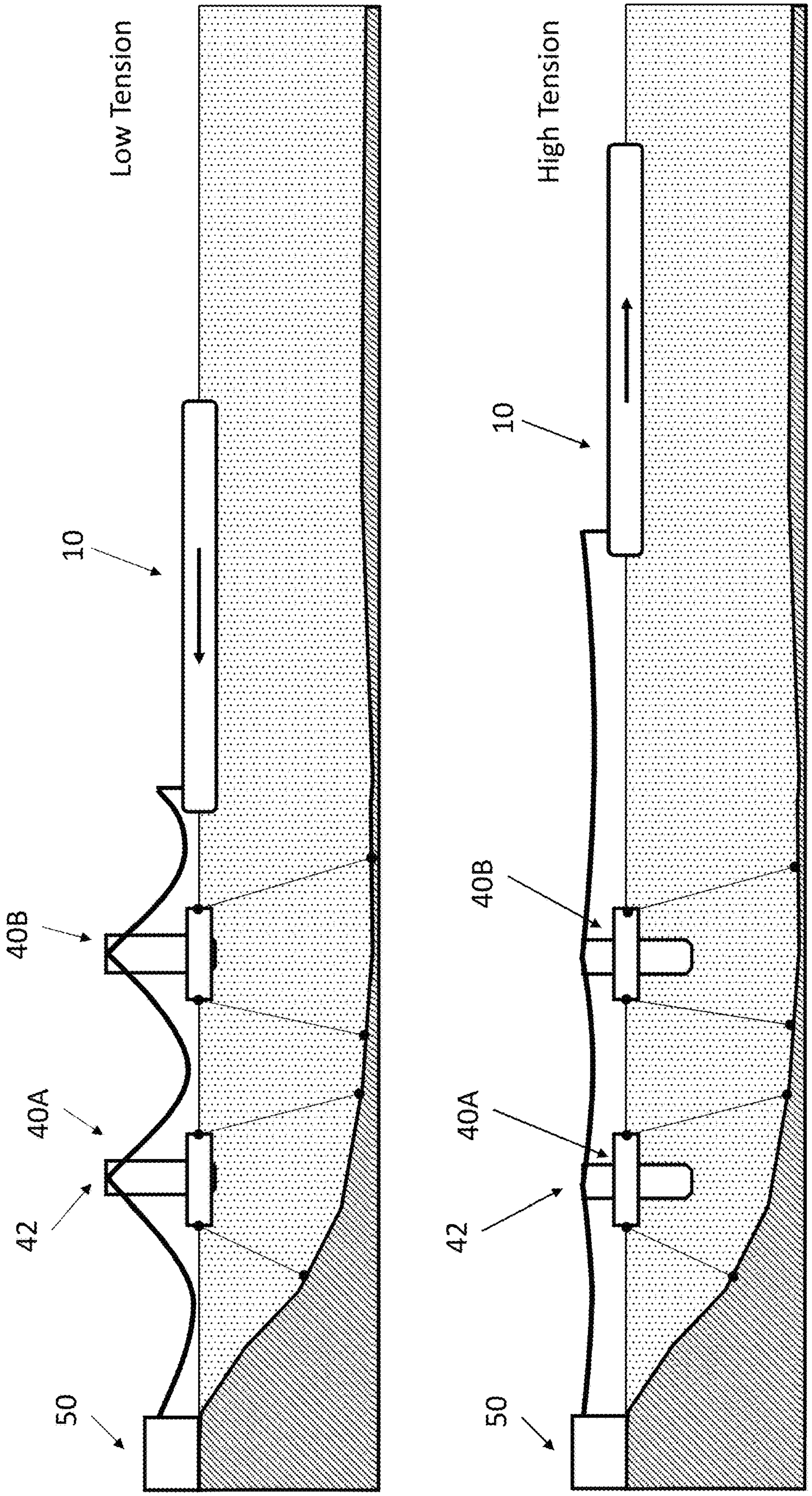
FIG. 5A is a schematic illustration of a power or communication cable running from shore to a floating solar PV array, showing the cable being supported by vertically moveable floating towers for adjusting the effective length, taking up slack or maintaining tension in the cable. In the low-tension scenario when the floating solar PV array is closer to shore, the floating towers rise to manage the extra cable slack.
FIG. 5B is an illustration similar to FIG. 5A, but with the floating solar PV array having moved farther from shore in a high-tension scenario, where the floating towers drop to increase the effective cable length.

FIGS. 5A and 5B illustrate a further optional aspect of the present system involving a series of floating towers 40A and 40B between onshore point 50 and floating solar PV array 10. The use of a floating tower 40A/40B is very similar to floating tower 40 in FIG. 1. In FIGS. 5A and 5B, however, cable 22 is instead connected to the floating tower at location 42 on the floating tower that can move vertically with respect to the water level as the tower moves up and down. For example, the towers 40A and 40B may have a moveable center portion (shown positioned upwardly in FIG. 5A and downwardly in FIG. 5B) on which the cable 22 is mounted. When array 10 is closer to shore (FIG. 5A), the towers' center portions are raised to keep cable 22 out of the water. Conversely, when array 10 is farther from shore, the towers' center portions are lowered to provide an additional length of cable between the shore point 50 and array 10. It is to be understood that the vertically movable location 42 on the floating tower may be provided by having the part of the tower that supports cable 22 move upwards and downwards. It is also to be understood that towers 40A and 40B may instead be towers that are built to be mounted to the bottom of the body of water.

Figure 6:
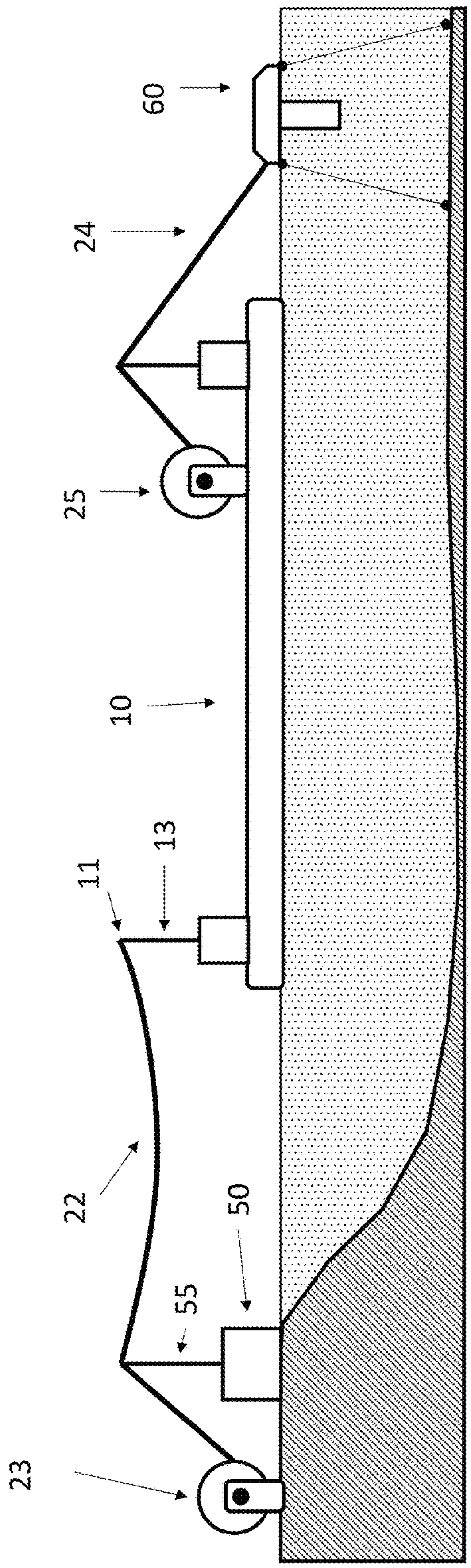
FIG. 6 is a schematic illustration of a floating solar PV array having a first cable connected to shore and a second cable connected to a floating surface aerator.

Next, FIG. 6 illustrates a floating solar PV array 10 that is connected to onshore point 50 by cable 22 on towers 11 and 55 (as seen in FIG. 1), but is also connected to a floating water treatment machine such as floating aerator 60 by a power cable 24. Power cable 24 is wrapped around a winch 25 that operates similar to onshore winch 23 described above. In operation, as array 10 moves about on the water surface, the operation of winches 23 and 25 can be synchronized such that winch 23 can be letting out more cable 22 as winch 25 retracts more cable 24, or vice versa. Situations may also exist where both winches 23 and 25 simultaneously extend or retract cable, and do so at the same or different speeds, all depending upon the two dimensional motion of array 10 on the plane of the water.

FIGS. 7A and 7B illustrate an embodiment of the present system in which cable 22 is instead a submerged cable running along the bottom of the body of water. In this embodiment, winch 23 retracts cable 22 as array 10 moves closer to shore (FIG. 7A) and extends cable as array 10 moves farther from shore (FIG. 7B). In this embodiment, and in any of the other disclosed embodiment, array 10 may be outfitted with a GPS system for transmitting its location to the cable tensioning system 20 (which controls the operation of winch).

Figure 8E:
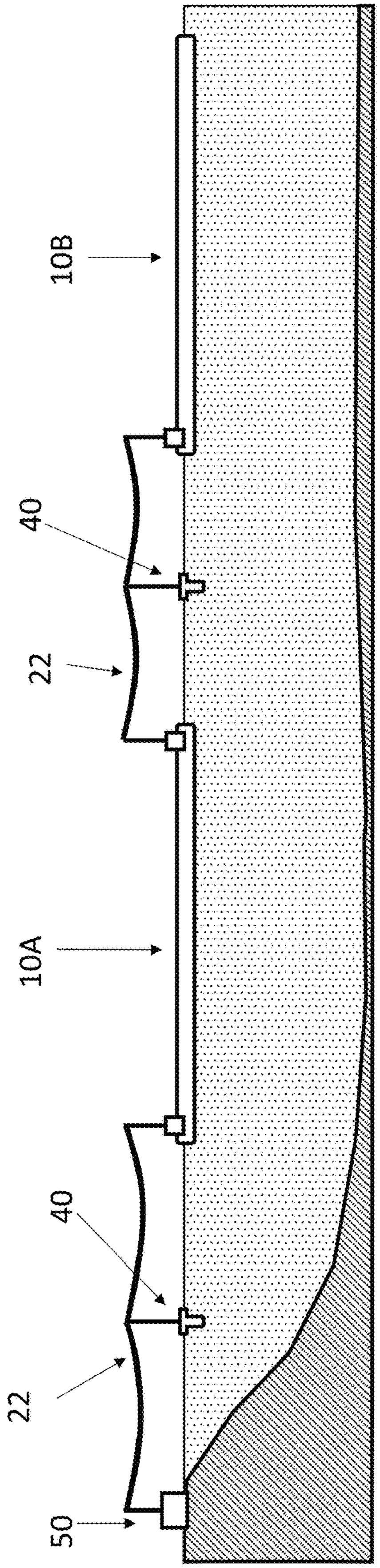
FIG. 8E is similar to FIGS. 8A, 8B and 8C, but uses a first floating tower between shore and the first floating solar PV array and a second tower between the first and second floating solar PV arrays.

FIGS. 8A to 8E show the various deployment locations of cable 22 that can be managed by the present cable tensioning system 20. Specifically, cable 22 may be positioned at the water level supported by cable buoys 210 (FIG. 8A), positioned at water level supported by a series of floats 230, providing a structure akin to a floating walkway (FIG. 8B), or fully submerged underwater (FIG. 8C). FIG. 8C illustrates cables 22 connected to the ends of the floating arrays 10. In contrast, FIG. 8D illustrates cable 22 instead being connected to central locations on arrays 10. The embodiment of FIG. 8D may be preferred when arrays 10 are rotated about a central vertical axis to track motion of the sun over the course of a day. Lastly, FIG. 8E illustrates the embodiment of the present system where one or more floating towers 40 are used to support cables 22 out of the water. It is to be understood that the present cable management system works well with all of these various cable support embodiments.

As emphasized herein, the present cable management system can be used to adjust the effective length of cable between two different locations. As such, the present cable management system can be used to adjust the tension in the cable (for example by pulling in or retracting cable or by unspooling or extending more cable as needed in response to tension in the cable). As illustrated herein, the two different locations between which the cable is linked or suspended can be at a wide variety of locations and on a wide variety of objects. For example, a first end of the cable may be connected to an onshore point 50, a first floating solar PV array 10, a second floating solar PV array 10, a floating tower 40 or a floating central cable hub (300 in FIG. 9E). The second end of the cable may be connected to the first floating solar PV array 10, the second floating solar PV array 10, the floating tower 40, or the floating central cable hub 300. The onshore point 50 may be the electrical box for an onshore power grid. In addition, the cable itself may be supported at or near water level, hung above the water level or submerged underwater, all keeping within the scope of the present invention.

In preferred aspects, the present system provides a cable tensioning system 20 for a plurality of floating solar PV arrays, comprising: a plurality of floating solar PV arrays 10; a cable system (comprising one or more cables 22) connecting either a first floating solar PV array or connecting a floating central cable hub to an onshore point; and a cable tensioning system 20, wherein the cable tensioning system adjusts the effective length or maintains tension in a cable 22 in the cable system while permitting each of the plurality of floating solar arrays 10 to move on the water.

Figure 9A:
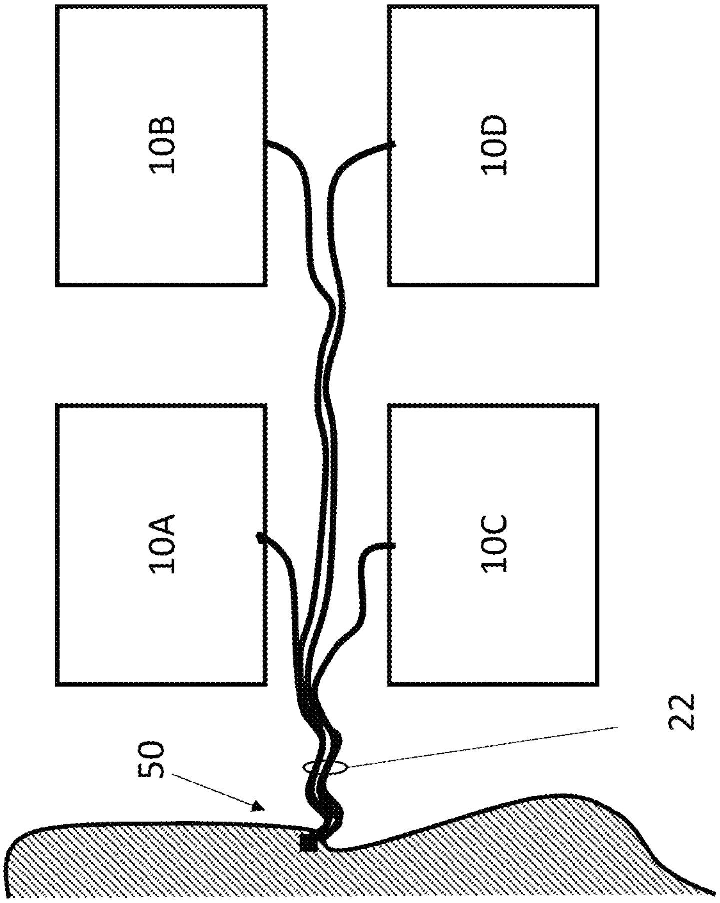
Fig. 9A PRIOR ART
FIG. 9A is a schematic top plan illustration of four floating solar PV arrays, each separately cabled to shore. No cable tensioning or cable length adjustment is being used.

FIGS. 9A to 9E illustrate various arrangements deploying multiple floating solar PV arrays 10, all connected to a single onshore point 50. FIG. 9A illustrates the "prior art" approach in which the present cable management system is not used. In this illustration, arrays 10A, 10B, 10C and 10D are each connected by their own individual cables 22 to the onshore point. As can be seen, the cables 22 are not organized. They can be submerged cables strewn about the bottom of the body of water. This approach is messy and unorganized and the cables may become tangled or pulled as the various arrays 10A to 10D move about in different directions. The cables in FIG. 9A could also be cables supported by floats or floating walkways, however, this approach is also messy and unorganized since once again the various cables may become tangled or pinched as their supporting floating buoys or walkways move about with respect to one another. Moreover, using floating buoys or walkways simply increases the number of moving objects on the water's surface, again increasing the risk of the cables becoming tangled or pulled, or of the floating buoys or walkways moving to locations that restrict the movement of the arrays 10.

Figure 9B:
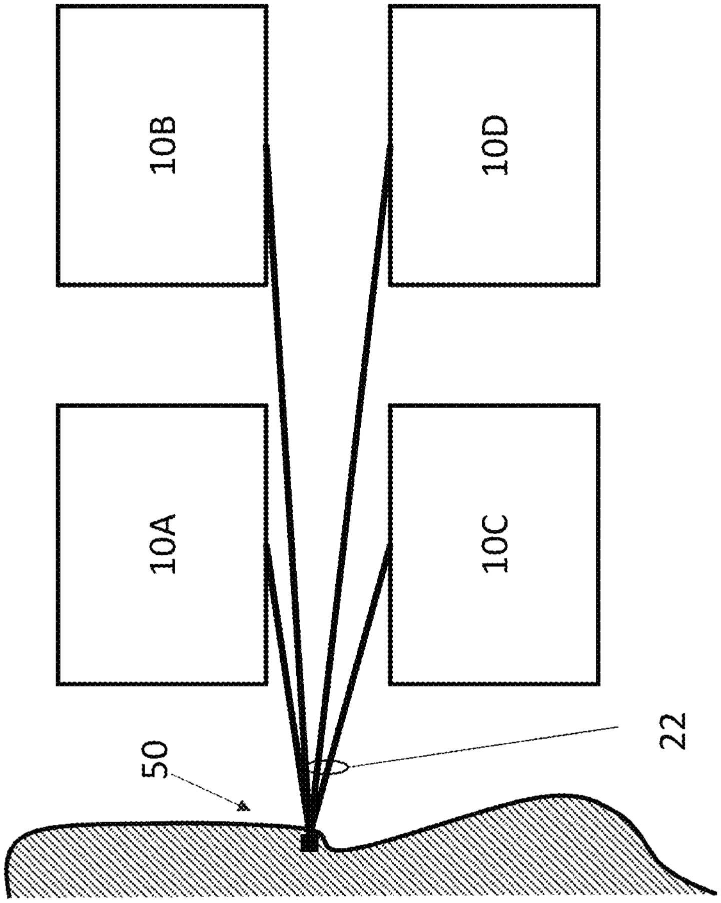
FIG. 9B is a view similar to FIG. 9A, but with each of the floating solar PV arrays instead using cable tensioning in accordance with the present system.

FIG. 9B illustrates a first approach to cable management in accordance with the present system. As illustrated, each array 10A to 10D uses its own dedicated cable tensioning system 20 to ensure that its own cables 22 are tensioned to have an appropriate length to onshore point 50. As described herein, additional lengths of cables 22 will be deployed as the arrays 10A to 10D move farther from shore and cables 22 will be retracted (or raised further above the water) as the arrays 10A to 10D move closer to shore.

Figure 9D:
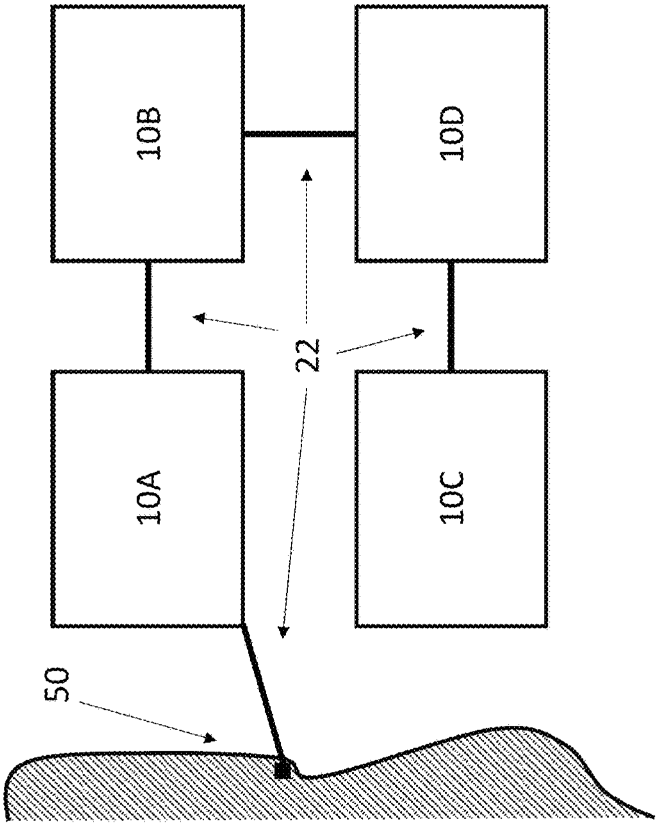
FIG. 9D is similar to FIG. 9C, but shows the floating solar PV arrays cabled in a series "daisy chain" configuration.
Figure 9C:
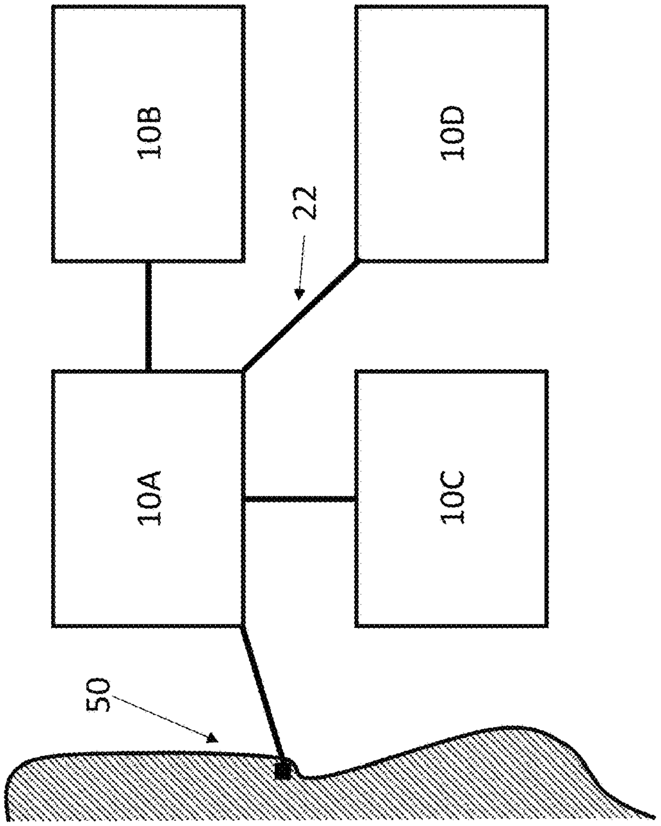
FIG. 9C is similar to FIG. 9B, but has a plurality of floating solar PV arrays cabled in parallel to a first floating solar PV array.
Figure 9E:
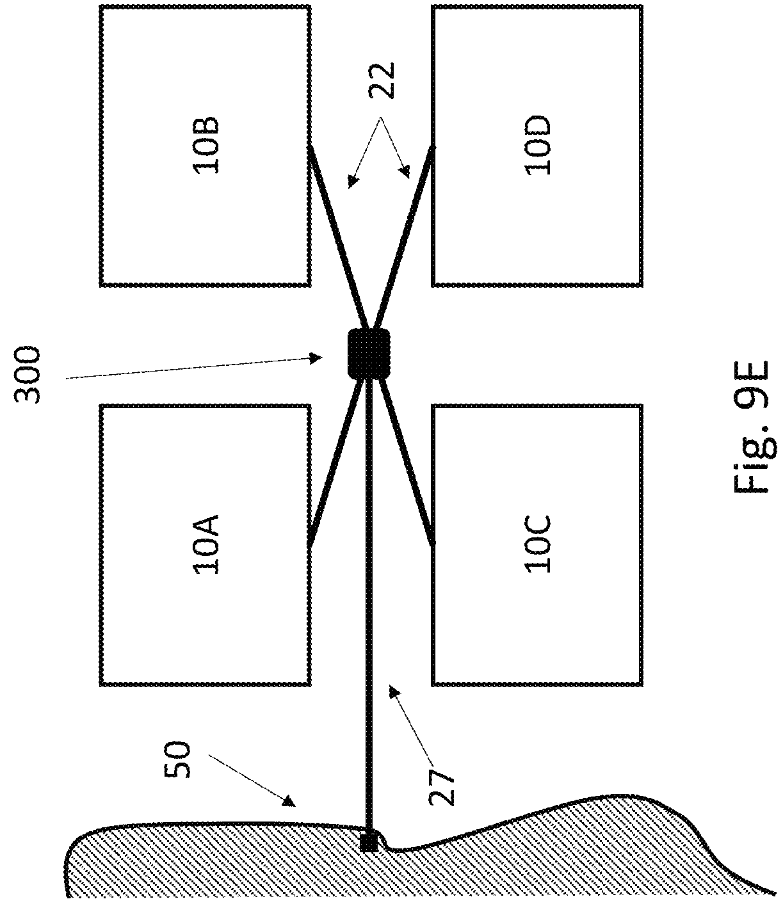
FIG. 9E is a view similar to FIG. 9A, but instead using a floating central cable hub with tensioned or length adjusted cables running to the floating central cable hub and to shore.

FIG. 9C illustrates an arrangement where the cable system routes cables from the first floating solar PV array 10A to onshore point 50, and cables from the other floating solar PV arrays 10B, 10C and 10D are routed in parallel to the first floating solar PV array 10A. FIG. 9D illustrates an arrangement where the cable system routes cables from the first floating solar PV array 10A to onshore point 50, and cables from the other floating solar PV arrays 10B, 10C and 10D are routed in series (in a "daisy chain" configuration) to the first floating solar PV array 10A. Lastly, FIG. 9E illustrates an embodiment of the invention in which each of arrays 10A to 10D has their cables routed to a floating central cable hub 300. A single cable or a single bundle of cables 27 then runs from floating central cable hub 300 to onshore location 50. In this embodiment, separate cable tensioning systems 20 may be used to tension or adjust the length of cables 22 running between each of arrays 10A to 10D and floating central cable hub 300. In addition, a separate cable tensioning system 20 may be used on cable 27 between onshore point 50 and floating central cable hub 300. When running DC cabling to shore, the central floating cable hub 300 is preferably a recombiner. When running AC cabling to shore, the central floating cable hub 300 would preferably contain an inverter and a transformer. It is to be understood that the present system can be used with all these different arrangements of multiple floating arrays 10 and with combinations of these arrangements (for example where cables from some arrays 10 are routed in series and others are routed in parallel).

Figure 10C:
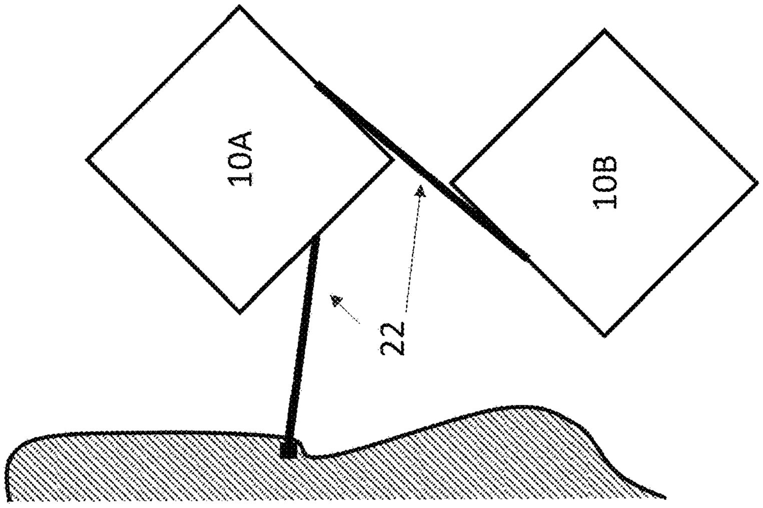
FIG. 10C is a view similar to FIGS. 10A and 10B, showing both rotational and translational movement of the floating solar PV arrays relative to their starting positions in FIG. 10A.
Figure 10B:
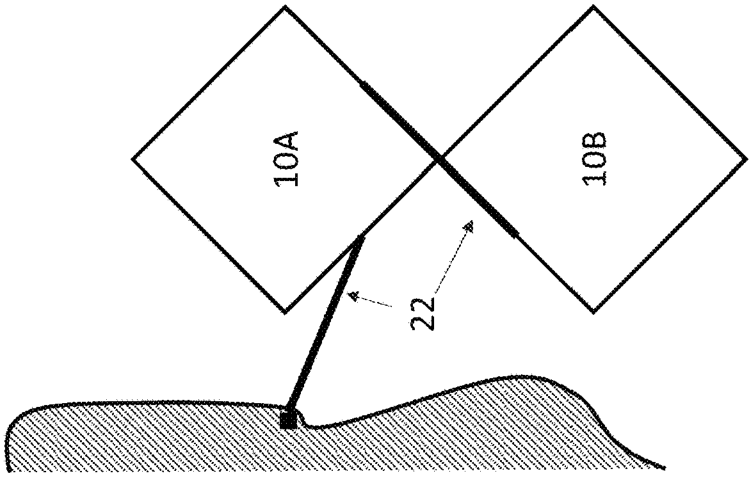
FIG. 10B is a view similar to FIG. 10A, but after the floating solar PV arrays have rotated in position.
Figure 10A:
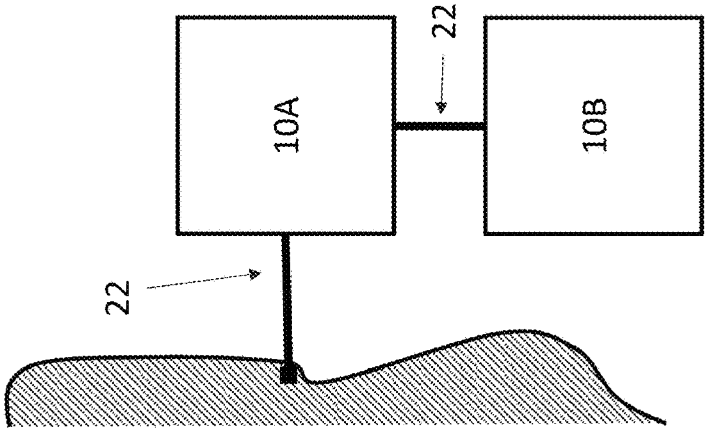
FIG. 10A is a top plan view of a pair of floating solar PV arrays with tensioned or managed cables.

Lastly, FIGS. 10A to 10C illustrate rotation and translation of a pair of floating arrays 10A and 10B. In FIG. 10A, the arrays 10A and 10B are shown prior to any movement. The present cable tensioning system 20 is used to connect array 10A to onshore point 50 and a second cable tensioning system 20 is used to connect array 10B to array 10A. Next, in FIG. 10B, arrays 10A and 10B have rotated in position. As can be seen, cables 22 have been lengthened accordingly. Finally, in FIG. 10C, arrays 10A and 10B have moved farther apart from one another. As can be seen, cables 22 have been further lengthened to accommodate this motion.

It is to be understood that the present invention encompasses those embodiments presented herein and also encompasses variations to these embodiments that would be obvious to one skilled in the relevant art.

What is claimed is:

1. A cable management system for a floating solar photovoltaic array, comprising:

a floating solar photovoltaic array;

a cable system connecting the floating solar photovoltaic array to an onshore point; and a cable tensioning system, wherein the cable tensioning system adjusts an effective length of a power transmission or communication cable or maintains tension in the power transmission or communication cable while permitting the floating solar array to move about on the water, and wherein the cable tensioning system extends the power transmission or communication cable when the floating solar photovoltaic array moves farther from shore, and wherein the cable tensioning system retracts the power transmission or communication cable when the floating solar photovoltaic array moves closer to shore.

2. The cable management system of claim 1, wherein the cable tensioning system comprises a winch for retracting the cable as the floating solar array moves closer to shore and for extending the cable as the floating solar array moves farther away from shore.

3. The cable management system of claim 1, wherein the cable tensioning system supports the cable in an elevated position above water level.

4. The cable management system of claim 1, wherein the cable spans between a first point and a second point, and wherein the first point is located at any one of:

the onshore point, the floating solar photovoltaic array, a second floating solar photovoltaic array, a floating tower or a floating central cable hub, and wherein the second point is located at any one of:

the floating solar photovoltaic array, the second floating solar photovoltaic array, the floating tower, or the floating central cable hub.

5. The cable management system of claim 1, further comprising:

a plurality of cable floats supporting the cable at or near water level.

6. The cable management system of claim 1, wherein a section of the cable is submerged underwater.

7. A cable management system for a floating solar photovoltaic array, comprising:

a floating solar photovoltaic array;

a cable system connecting the floating solar photovoltaic array to an onshore point; and a cable tensioning system, wherein the cable tensioning system adjusts an effective length of a cable or maintains tension in the cable while permitting the floating solar array to move on the water, wherein the cable tensioning system comprises a counterweight and pulley system for retracting the cable as the floating solar array moves closer to shore and for extending the cable as the floating solar array moves farther away from shore.

8. A cable management system for a floating solar photovoltaic array, comprising:

a floating solar photovoltaic array;

a cable system connecting the floating solar photovoltaic array to an onshore point; and a cable tensioning system, wherein the cable tensioning system adjusts an effective length of a cable or maintains tension in the cable while permitting the floating solar array to move on the water, wherein the cable tensioning system supports the cable in an elevated position above water level, further comprising:

at least one floating tower, wherein the cable passes from the onshore point to the floating tower, and from the floating tower to the floating solar photovoltaic array or to a floating central cable hub.

9. The cable management system of claim 8, wherein the cable management system comprises a plurality of floating towers between the onshore point and the floating solar photovoltaic array or floating central cable hub.

10. The cable management system of claim 8, wherein the cable is connected to the floating tower at a location on the floating tower that can move vertically with respect to the water level.

11. A cable management system for a floating solar photovoltaic array, comprising:

a floating solar photovoltaic array;

a cable system connecting the floating solar photovoltaic array to an onshore point; and a cable tensioning system, wherein the cable tensioning system adjusts an effective length of a cable or maintains tension in the cable while permitting the floating solar array to move on the water, wherein the cable tensioning system comprises:

an elastic member that contracts as the floating solar photovoltaic array moves closer to shore and stretches as the floating solar photovoltaic array moves farther away from shore, and wherein the cable is supported by the elastic member.

12. A cable management system for a plurality of floating solar photovoltaic arrays, comprising:

a plurality of floating solar photovoltaic arrays;

a cable system connecting either a first floating solar photovoltaic array or a floating central cable hub to an onshore point; and a cable tensioning system, wherein the cable tensioning system adjusts an effective length of a power transmission or communication cable or maintains tension in the power transmission or communication cable in the cable system while permitting each of the plurality of floating solar arrays to move about on the water relative to each other and the shore, and wherein the cable tensioning system extends the power transmission or communication cable when the floating solar photovoltaic array moves farther from shore, and wherein the cable tensioning system retracts the power transmission or communication cable when the floating solar photovoltaic array moves closer to shore.

13. The cable management system of claim 12, wherein the cable system connects the first floating solar photovoltaic array to the onshore point, and wherein other floating solar photovoltaic arrays are connected in series to the first floating solar photovoltaic array.

14. The cable management system of claim 12, wherein the cable system connects the first floating solar photovoltaic array to the onshore point, and wherein other floating solar photovoltaic arrays are connected in parallel to the first floating solar photovoltaic array.

15. The cable management system of claim 12, wherein the cable system connects the floating central cable hub to the onshore point, and wherein the plurality of floating solar photovoltaic arrays are connected to the floating central cable hub.

16. The cable management system of claim 12, wherein the cable tensioning system comprises one of a winch, a counterweight, or an elastic member.

17. The cable management system of claim 12, wherein the cable tensioning system comprises a plurality of separate cable tensioning systems distributed among the plurality of solar photovoltaic arrays.

18. A cable management system for a plurality of floating solar photovoltaic arrays, comprising:

a plurality of floating solar photovoltaic arrays;

a cable system connecting either a first floating solar photovoltaic array or a floating central cable hub to an onshore point; and a cable tensioning system, wherein the cable tensioning system adjusts an effective length of a cable or maintains tension in the cable in the cable system while permitting each of the plurality of floating solar arrays to move on the water relative to each other and the shore, further comprising:

a floating water treatment machine;

a cable connecting the floating water treatment machine to one of the plurality of floating solar photovoltaic arrays; and a cable tensioning system for maintaining tension in the cable connecting the floating water treatment machine to one of the plurality of floating solar photovoltaic arrays.

* * * * *